(12) United States Patent
Bially et al.

(10) Patent No.: US 6,868,114 B2
(45) Date of Patent: Mar. 15, 2005

(54) INTERFERENCE SUPPRESSION IN A SPREAD SPECTRUM COMMUNICATIONS SYSTEM USING NON-LINEAR FREQUENCY DOMAIN EXCISION

(75) Inventors: Theodore Bially, Sudbury, MA (US); Paul F. McKenzie, Westford, MA (US)

(73) Assignee: The Titan Corporation, San Diego, CA (US)

( * ) Notice: Subject to any disclaimer, the term of this patent is extended or adjusted under 35 U.S.C. 154(b) by 662 days.

(21) Appl. No.: 09/919,121

(22) Filed: Jul. 30, 2001

(65) Prior Publication Data

US 2002/0094022 A1 Jul. 18, 2002

Related U.S. Application Data

(60) Provisional application No. 60/262,499, filed on Jan. 18, 2001.

(51) Int. Cl.[7] .............................. H04B 1/69; G06F 17/14
(52) U.S. Cl. ......................... 375/148; 375/350; 708/404
(58) Field of Search ................................ 375/148, 229, 375/232, 260, 350; 708/300, 323, 400, 404

(56) References Cited

U.S. PATENT DOCUMENTS

| 3,932,818 | A | | 1/1976 | Masak ........................ 328/167 |
|---|---|---|---|---|
| 4,287,475 | A | | 9/1981 | Eaton et al. ................. 328/167 |
| 4,613,978 | A | | 9/1986 | Kurth et al. .................... 375/99 |
| 5,029,184 | A | | 7/1991 | Andren et al. ................... 375/1 |
| 5,263,048 | A | | 11/1993 | Wade ............................. 375/1 |
| 5,629,929 | A | * | 5/1997 | Blanchard et al. ........... 370/201 |
| 5,671,247 | A | | 9/1997 | Souissi et al. ............... 375/200 |
| 5,717,717 | A | | 2/1998 | Yang et al. .................. 375/232 |
| 5,844,936 | A | | 12/1998 | Lesthievent ................. 375/206 |
| 5,974,101 | A | | 10/1999 | Nago .......................... 375/350 |
| 6,246,729 | B1 | * | 6/2001 | Richardson .................. 375/324 |
| 6,360,369 | B1 | * | 3/2002 | Mahoney ..................... 725/111 |

FOREIGN PATENT DOCUMENTS

| WO | WO 00/04657 | 1/2000 | ........... H04B/15/00 |
|---|---|---|---|

OTHER PUBLICATIONS

Victor T. Tom et al., "Morphology–based Target Detection and Discrimination", Gaciac—Tactical Weapon Guidance & Control Information Analysis Center, vol. 1: Unclassified Papers, pp. 291–299 (1990).

Tamar Peli et al., "Morphology–based algorithms for target detection/segmentation in FLIR imagery", SPIE—The International Society for Optical Engineering, vol. 1957, pp. 85–94 (1993).

(List continued on next page.)

*Primary Examiner*—Khai Tran
(74) *Attorney, Agent, or Firm*—Weingarten, Schurgin, Gagnebin & Lebovici LLP

(57) ABSTRACT

In a frequency-domain excision system for a wide band receiver, a window function is applied to blocks of received signal samples and a transform function is applied to the windowed blocks. Each block of frequency-domain coefficients from the transform function is morphologically filtered to generate a threshold function representing an estimate of the spectrum of the desired wide band signal, and a non-linear gain function is applied to the coefficients. The gain function has a fixed-gain region for input values less than a threshold value from the threshold function, an excision region for input values greater than a multiple of the threshold value, and a soft limiting region between the fixed-gain region and the excision region. The inverse transform is performed on the excised blocks of coefficients, and an overlap-eliminating central portion of the inverse of the window function is applied to the resulting blocks of signal samples.

20 Claims, 6 Drawing Sheets

OTHER PUBLICATIONS

Victor T. Tom et al., "Morphology–based algorithm for Point Target Detection in Infared Backgrounds", SPIE—The International Society for Optical Engineering, vol. 1954, pp. 2–11 (1993).

John w. Ketchum et al., "Adaptive Algorithms for Estimating and Suppressing Narrow–Band Interference in PN Spread–Spectrum Systems", IEEE Transactions on Communications, vol. Com–30 No. 5, pp. 913–924 (1982).

Sorin Davidovici et al., "Narrow–Band Interference Rejection Using Real–Time Fourier Transforms", IEEE Transactions on Communications, vol. 37 No. 7, pp. 713–722 (1989).

Stuart D. Sandberg et al., "Some Alternatives in Transform–Domain Suppression of Narrow–Band Interference for Signal Detection and Demodulation", IEEE Transactions on Communication, vol. 43 No. 12, pp. 3025–3036 (1995).

Ronald a. Iltis et al., "Performance Analysis of Narrow–Band Interference Rejection Techniques in DS Spread–Spectrum Systems", IEEE Transactions on Communications, vol. Com–32 No. 11, pp. 1169–1177 (1984).

Laurence B. Milstein et al., "An Analysis of a Real–Time Transform Domain Filtering Digital communication System–Part I: Narrow–Band Interference Rejection", IEEE Transactions on Communications, vol. Com–28 No. 6, pp. 816–824 (1980).

Loh–Ming Li et al., "Rejection of Narrow–Band Interference in PN Spread–Spectrum Systems Using Transversal Filters", IEEE Transactions on Communications, vol. Com–30 No. 5, pp. 925–928 (1982).

Takeharu Kohri, "An Interference Suppressor for CW and Narrow–Band Signals Using Filter Bank on CDMA Communications", IEEE Transactions on Communications, pp. 521–525 (1994).

Stuart D. Sandberg, "Adapted Demodulation for Spread–Spectrum Receivers which Employ Transform–Domain Interference Excision", vol. 43 No. 9, pp. 2505–2510 (1995).

John Gevargiz et al., "Adaptive Narrow–Band Interference Rejection in a DS Spread–Spectrum Intercept Receiver Using Transform Domain Signal Processing Techniques", IEEE Transactions on Communications, vol. 37 No. 12, pp. 1359–1366 (1989).

* cited by examiner

INTERFERENCE SUPPRESSION IN A SPREAD SPECTRUM COMMUNICATIONS SYSTEM USING NON-LINEAR FREQUENCY DOMAIN EXCISION

CROSS REFERENCE TO RELATED APPLICATIONS

This application claims priority under 35 U.S.C. §119(e) of provisional patent application No. 60/262,499 filed Jan. 18, 2001, the disclosure of which is incorporated by reference herein.

STATEMENT REGARDING FEDERALLY SPONSORED RESEARCH OR DEVELOPMENT

Not Applicable

BACKGROUND OF THE INVENTION

The present invention is related to the field of interference suppression in wideband communications systems such as spread-spectrum communications systems.

The explosive growth of wireless communications has necessitated new and innovative approaches to assigning and using the fundamentally limited frequency spectrum. One proposed solution is to permit a given spectral band to be shared by two or more user communities that employ different signaling methods, provided the signals produced by one group of users don't materially affect the communications efficacy of the others. One practical method is to allow wideband, spread-spectrum communications to be conducted in the same frequency bands that support narrowband users. In this approach a wideband transmitter spreads its energy over a much larger portion of the allocated band than do the narrowband transmitters. Because a narrowband receiver is sensitive to narrowband signals, it intercepts only a small fraction of the energy transmitted by a wideband user. The effect of this small amount of interference on the narrowband system is commensurately small and generally negligible.

A similar argument does not apply for a spread spectrum user. Because it is sensitive over a wide band, a wideband receiver intercepts all the narrowband signals in its band in addition to the wideband signal of interest. Each of the interfering narrowband signals is received at full energy. Such interfering signals can significantly degrade communications performance by overwhelming the receiver with strong interfering energy and/or by causing transmitter power control algorithms to compensate for the interference by increasing the transmit power level. The latter can have the effect of increasing the level of interference caused to narrowband users by the spread spectrum system, thereby degrading the quality of service for narrowband as well as wideband users.

Frequency domain excision techniques have been used to address the problem of narrowband interference in wideband systems. In frequency domain excision, a Fourier transform is applied to a sampled version of the received baseband communications signal to convert the input time waveform into the frequency domain. The Fourier transform is typically implemented in digital form using the Fast Fourier Transform (FFT) algorithm. Once the frequency domain representation has been generated, the locations of the interfering signals are determined, generally by identifying anomalous peaks in the frequency-domain spectrum. One or another type of non-linear processing is then performed on the spectral coefficients in order to suppress the effects of unwanted narrowband signals. The modified frequency domain coefficients are then transformed back to the time domain using an inverse FFT in order to construct the output signal.

One limitation of such conventional frequency-domain processing is that a narrowband interfering signal generally appears in more than one FFT coefficient, or frequency bin, even though the actual frequency of the interfering signal may be localized to a single bin. This problem arises due to the poor frequency sidelobe structure of the FFT. The excision system eliminates many more FFT coefficients than necessary, resulting in serious degradation of receiver performance despite the removal of the interfering signal.

The usual solution to the frequency sidelobe problem is to apply a multiplicative window to each input block of samples prior to computing the Fourier transform. Specifically, if the N-point window function is denoted W(n) and the input data for the $k^{th}$ block is denoted as X(k,n), then windowed data $X_w(k,n)$ which is used as the input to the Fourier transform is given by $X_w(k,n)=X(k,n)\times W(n)$. Several popular window functions include the Bartlett, Blackman, Chebyshev, Hamming, Hanning and Kaiser windows. All of these have the same general shape, in which they are symmetric about their mid-point and monotonically decrease from their largest value at the center, to zero or near-zero at the end points. Depending on which window is used, varying amounts of sidelobe suppression can be achieved in exchange for somewhat reduced frequency resolution.

Although the application of an input window reduces or eliminates the sidelobe problem and facilitates removal of only those frequency bins that truly contain interfering signals, it also introduces distortion into the reconstructed time sequence produced by the inverse Fourier transform. This distortion affects the performance of the downstream receiver demodulator. Several techniques have been suggested for mitigating window-induced distortion, such as the use of adaptive, time-varying demodulation techniques and the use of transforms other than the Fourier transform. These techniques suffer from computational complexity and relatively high cost.

One key aspect of excision performance is the estimation of appropriate thresholds that are used to distinguish desirable signals from interfering signals. Currently, various sliding window averages and median filtering techniques are used. In addition to being computationally costly, the performance of many of these methods degrades significantly in the presence of large numbers of interfering signals. Additionally, many excision techniques require the use of specialized demodulation logic in the receiver, resulting in added cost, complexity and power consumption.

BRIEF SUMMARY OF THE INVENTION

In accordance with the present invention, methods and apparatus are disclosed for interference suppression in a wideband, spread-spectrum receiver. An essentially arbitrary number of simultaneous narrowband signals of different amplitudes and frequencies can be excised without materially degrading the performance of the wideband receiver. The interference suppression technique can be used to enable successful implementation of the above-described spectrum sharing strategy.

In the disclosed technique, a window function is applied to each of overlapped blocks of received signal samples. The window function has a central maximum and tapers to zero at beginning and ending points. A transform function is performed on the windowed blocks to generate corresponding blocks of frequency-domain coefficients.

Each block of frequency-domain coefficients is morphologically filtered to generate a threshold function for the block which represents an estimate of the spectrum of the desired wideband signal component. The threshold function includes threshold values corresponding to the coefficients. A gain function is applied to each coefficient of the block to generate an excised block of coefficients. The gain function for each coefficient has a fixed-gain region for input values less than a corresponding threshold value from the threshold function, an excision region for input values greater than a predetermined multiple of the corresponding threshold value, and a soft limiting region between the fixed-gain region and the excision region. The value of each coefficient is conditionally modified depending on which region it falls into. In particular, coefficients falling in the excision region are set equal to zero, while coefficients falling in the soft limiting region are multiplied by a value in inverse proportion to the coefficient value.

Once the excised blocks of coefficients have been generated, the inverse of the transform function is performed and an overlap-eliminating central portion of the inverse of the window function is applied to each excised block of signal samples.

A key feature of the excision technique is that it requires no synchronization or timing cues from the host receiver other than a commensurate rate sampling clock, and it necessitates no modification to the receiver's original demodulation logic. The latter is a serious problem for current state-of-the-art excision approaches, generally resulting in added cost, complexity and power consumption in the host radio's demodulation subsystem. Additionally, the technique requires only that each interfering source be narrowband relative to the bandwidth of the desired spread spectrum signal. The morphology-based calculation of the threshold function responds to geometric properties of the data and can easily distinguish anomalous features embedded in normal, or expected, backgrounds. The processing of overlapped blocks and the inverse windowing obviate any complicated and computationally costly adaptive demodulation methods that have been proposed in the literature, and which would serve to restrict the types of modulation that could be supported. Excision is effected using a mixed-mode thresholding strategy that allows the excision of strong interfering signals while applying softer limiting to those frequency components that exceed the threshold by lower margins.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which.

DETAILED DESCRIPTION OF THE INVENTION

Figure 1:
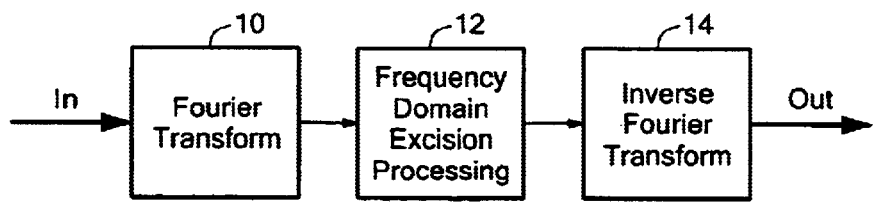
FIG. 1 is a general block diagram of a frequency-domain excision system as known in the art.

FIG. 1 shows the basic components of a classical frequency domain excision system. As described above, excision processing generally begins with a Fourier transform 10 (such as the FFT) to convert a block of input time waveform into the frequency domain. Once the frequency domain representation has been generated, the locations of the interfering signals are determined, generally by identifying anomalous peaks in the Fourier spectrum. Non-linear processing 12 is performed on the spectral coefficients to suppress the effects of unwanted narrowband signals. The modified frequency domain coefficients are then transformed back to the time domain using an inverse Fourier transform 14 in order to construct the output signal.

Figure 2:
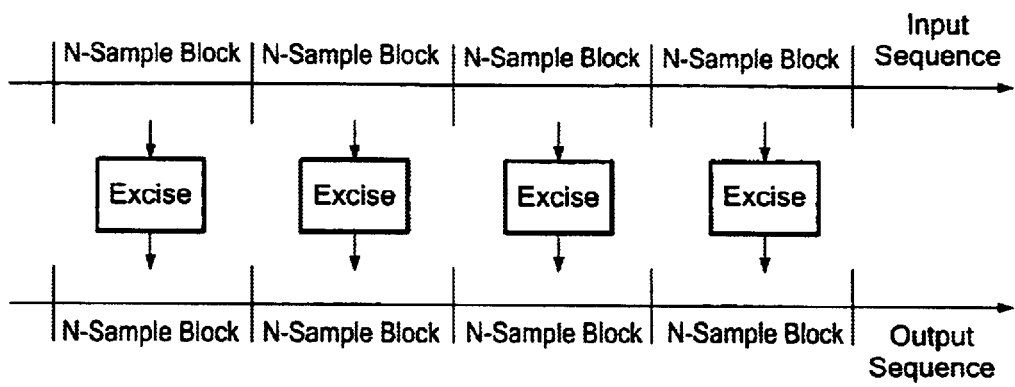
FIG. 2 is a diagram illustrating block-based processing of a sampled communications signal in the system of FIG. 1.

As shown in FIG. 2, the Fourier transform typically operates on finite length blocks of successive samples of the input signal. In the most basic implementation of a frequency domain excision system, the continuous input sequence is divided into contiguous blocks of N samples each. The processing of FIG. 1 is performed separately and independently on each such input block, producing an N-sample output block. Successive output blocks are then concatenated to form a continuous output sequence.

As mentioned above, one limitation of the processing depicted in FIG. 2 is that a narrowband interfering signal may appear in more than one FFT coefficient, or frequency bin, despite the fact that the actual frequency of the interfering signal may be localized to a single bin. As described below, this problem is addressed in the disclosed excision system by the use of overlap-save processing.

Figure 3:
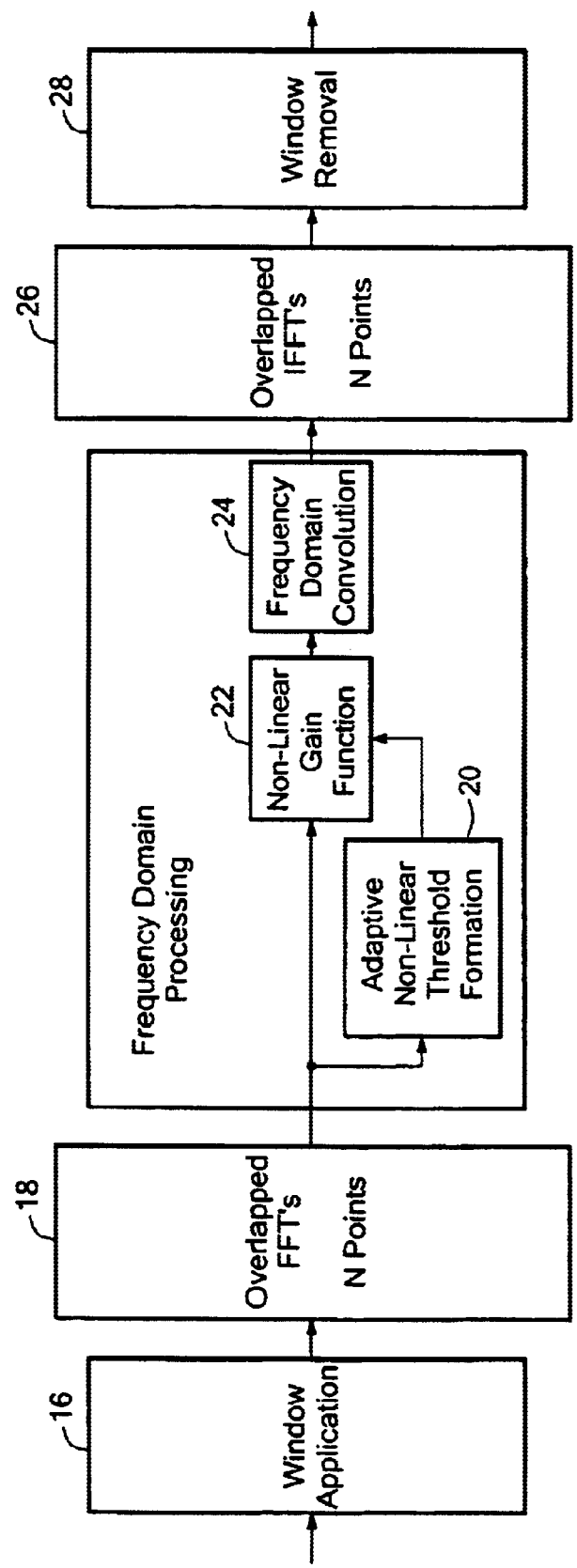
FIG. 3 is a block diagram of a frequency-domain excision system in accordance with the present invention.

FIG. 3 shows an improved excision processing system. An input time-domain baseband signal is applied to window processing 16, and the windowed data is converted to the frequency domain by overlapped FFT processing 18. The frequency domain data, or spectral coefficients, from the FFT processing 18 are supplied to adaptive non-linear threshold formation processing 20 and non-linear gain processing 22. The threshold formation processing 20 calculates a set of threshold values that is used by the gain processing 22 to effect excision. The excised output data is supplied to convolution processing 24 for purposes of smoothing. The output data then is converted back to the time domain by overlapped inverse FFT processing 26 and inverse window processing 28.

Figure 4:
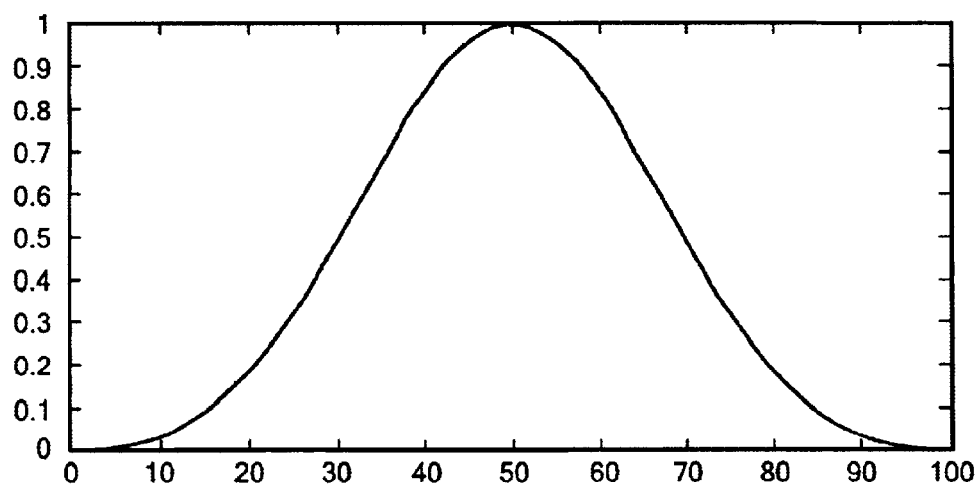
FIG. 4 is a plot of a Blackman window function used in the excision system of FIG. 3.

FIG. 4 shows the Blackman window function (in normalized form) applied by the window processing 16. The general characteristic is a smooth, symmetric curve having a maximum at its midpoint and diminishing to zero at its end points. As described above, the use of this window provides for suppression of undesirable FFT sidelobes.

Figure 5:
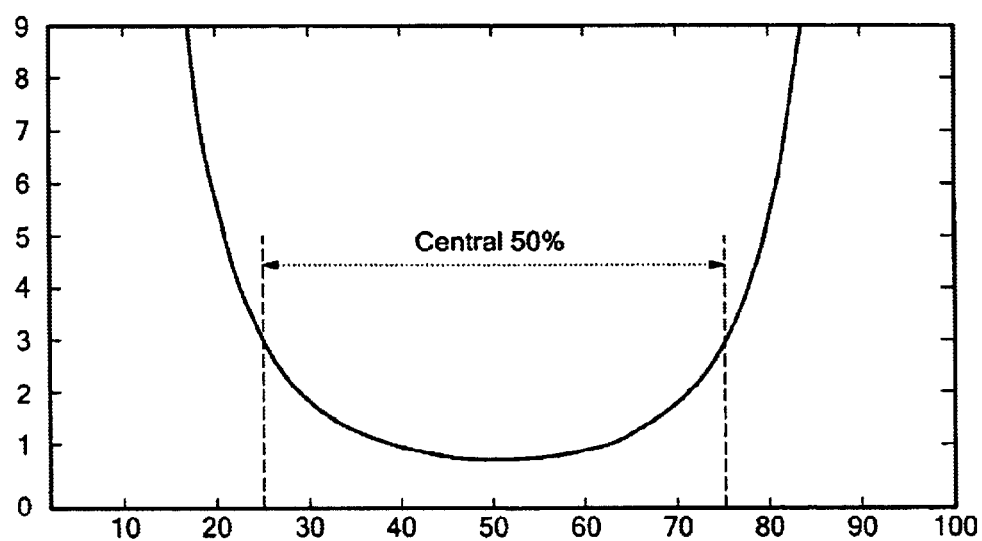
FIG. 5 is a plot of an inverse Blackman window function used in the excision system of FIG. 3.

FIG. 5 shows the inverse window function applied in the inverse window processing 28. Although this function goes to infinity at its endpoints, only the central 50% of the function is actually employed, as described in more detail below. Consequently, the gain provided by this function varies from 1 at the midpoint to about 3 at the endpoints.

Figure 6:
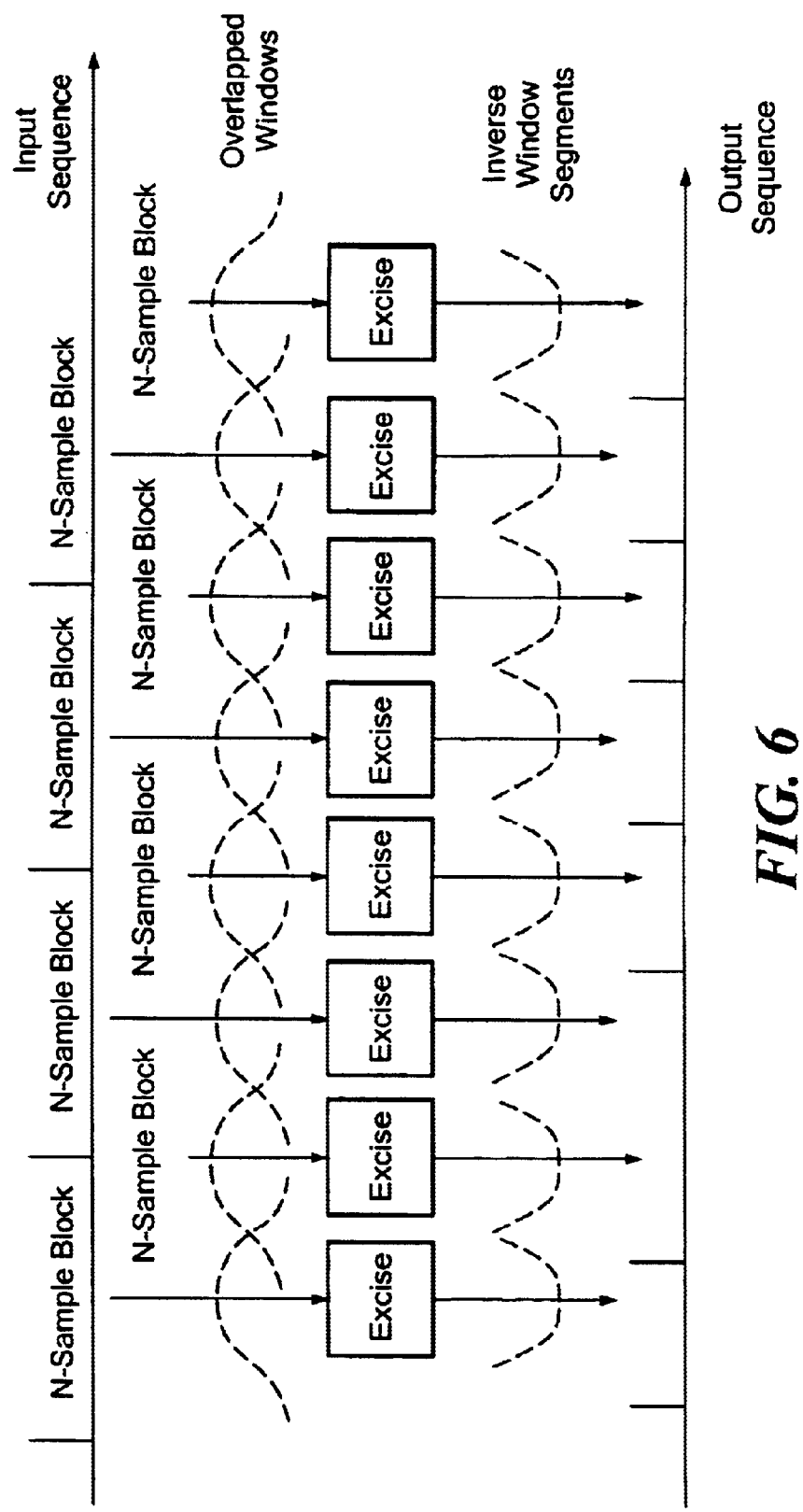
FIG. 6 is a diagram illustrating overlap-save excision processing used in the system of FIG. 3.

FIG. 6 illustrates the overall form of processing in the system of FIG. 3, which is called overlap-save processing. In the overlap-save method, each input sample is processed twice. A block of N successive samples is processed to yield N/2 output samples. The second half of the same N-point input block is then concatenated with the first half of the next N-point input block for the processing that yields the next N/2 output points. Note that all input blocks are of length N, and they are overlapped by 50%. All output blocks are of length N/2, corresponding to the central portion of the N-point inverse FFT (IFFT) processing 26. The half-length output blocks are concatenated to form a continuous output sequence. Overlap factors other than 50% are possible and may offer advantages in special applications. In general, overlap factors in the range from 25% to 75% are desirable. The use of overlap-save processing enables those portions of the inverse-windowed IFFT output that are near the edges to be discarded, and only the central portions to be used. A continuous output signal is produced by sequentially selecting the central regions of successive overlapped output records. The result of this processing is elimination of the input windowing effect on the output signal, and consequently elimination of the need for more complex demodulation methods.

More particularly, the first step in the processing consists of selecting a contiguous block of N input samples (baseband, complex) of the received signal. Next, the N-sample block is multiplied by an N-point window in order to minimize frequency domain sidelobes. Experiments were conducted using the Blackman window function of FIG. 4. The windowed data is then converted into the frequency domain using an N-point complex FFT 18. The processing is overlapped in time as shown in FIG. 6, using a 50% overlap factor. All blocks are processed identically.

Values of N as low as 128 and as high as 2048 have been used in simulation experiments. In general, higher values of N yield greater performance, albeit with a requirement for greater processing power. Systems using values as high as 2048 or 4096 may be feasible in the not too distant future.

Adaptive frequency domain threshold processing 20 (FIG. 3) is realized using a non-linear morphology-based technique. The preferred approach produces excellent spectral estimates even with large numbers of closely spaced narrowband interferers, and it does so using simple and easy-to-implement calculations. Frequency domain threshold functions are computed independently for each N-sample block of data, thereby allowing the system to respond rapidly to the appearance of new interfering signals or the disappearance of old ones, and to other changes in the signal and/or interference environments.

Details of the computation are described below, using the following notation:

a. R(n, k) is the $n^{th}$ value of an N-point sequence in the $k^{th}$ data block.

b. max(R(p):R(p±Q)) means the largest value in the (Q+1)-point subsequence of R between the indices p and p±Q, inclusive. min(R(p):R(p±Q)) means the smallest value in the same subsequence of points.

c. $(n±B)_N$ means the addition/subtraction is to be performed modulo-N. This has the effect of treating all N-point sequences as circular.

Threshold formation consists of the following steps, in sequence:

1. The complex FFT outputs X(n,k)+jY(n,k) are converted to magnitude format M(n,k), where M(n,k)= sqrt(X(n,k)$^2$+Y(n,k)$^2$) This yields an N-point array of real values.

2. A grayscale "closing" is performed on M(n,k) using a kernel of length C, where C is an odd number:

$$Z1(n)=\max(M((n-(C-1)/2)_N,k): M((n+(C-1)/2)_N,k)),$$

followed by $$Z2(n)=\min(Z1((n-(C-1)/2)_N,k): Z1((n+(C-1)/2)_N,k))$$

3. A grayscale "opening" is performed on the data generated by the closing, using an odd-length kernel of length L:

$$Z3(n)=\min(Z2((n-(L-1)/2)_N,k): Z2((n+(L-1)/2)_N,k)),$$

followed by $$Z4(n)=\max(Z3((n-(L-1)/2)_N,k): Z3((n+(L-1)/2)_N,k))$$

4. Threshold functions derived from successive blocks of data are averaged together with exponentially decaying memory using a simple one-pole recursive digital filter:

$$T(n,k)=A \times T(n,k-1)+(1-A) \times B \times Z_4(n,k)$$

There are five parameters in the above algorithm, namely N, C, L, A and B. Experiments have been conducted with N=1024. Values of C and L that have been found to work well with 1024-point sequences are 5 and 51, respectively. In general, the size of the first kernel C is chosen to correspond to the expected bandwidth of relatively isolated narrowband interferers, whereas the size of the second kernel L is chosen to correspond to the expected bandwidth of groups of closely-spaced interferers that might exist. "B" is a scale factor which has been selected to be 2.5. "A" is a smoothing parameter which is positive and less than unity (0=A<1). It can be set to zero, in which case there is no block-to-block smoothing. That is, each block is determined independently of each other, and T(n,k)=B×Z$_4$(n,k). A=0.9 represents a generally reasonable choice.

Figure 7:
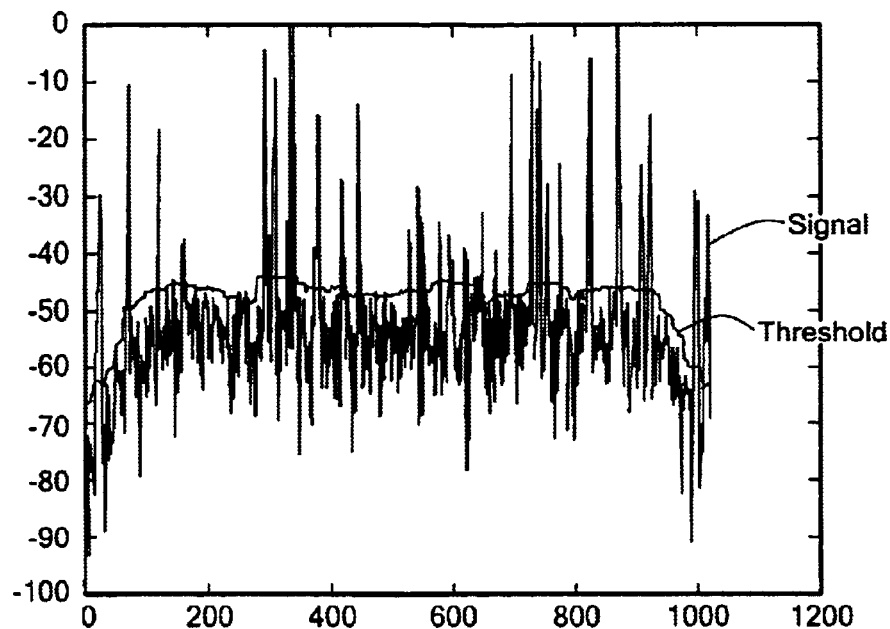
FIG. 7 shows superimposed plots of a baseband communications signal and an excision threshold function in the excision system of FIG. 3.

FIG. 7 shows a frequency domain plot of a spread spectrum signal received at 0 dB SNR, in the presence of 50 interfering narrowband signals of random frequencies and amplitudes. Superimposed on the plot is a trace indicating the threshold function as derived from the above-described procedure. As shown, the threshold function closely follows the peak of the desired spread-spectrum signal and resides well below the amplitudes of most of the interfering signals.

The threshold function produced by this procedure represents an estimate of the basic signal spectrum (or the noise spectrum, if the signal is below the noise). The only assumption built into the morphology-based estimator is that the N-point spectrum of the desired signal has the appearance of colored noise with a smoothly varying envelope as a function of frequency. This is a characteristic property of any well-designed spread spectrum signal, or of a spread spectrum signal plus receiver noise, or of noise alone.

Figure 8:
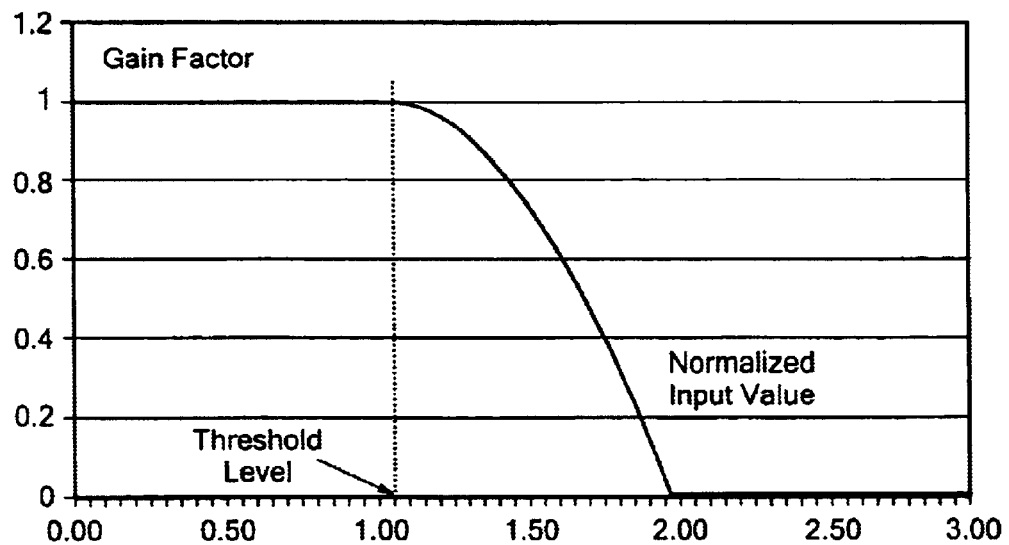
FIG. 8 is a plot of a non-linear gain function used in the excision system of FIG. 3.

FIG. 8 shows the gain function used in the non-linear gain processing 22 of FIG. 3. Excision is accomplished by adjusting the amplitudes of the spectral coefficients in accordance with this non-linear function. The gain adjustment is made independently in every block and in each frequency bin within a block. As shown, the values on the input axis are normalized to the threshold value for the frequency bin as provided by the threshold formation processing 20. Thus, if the signal value in a given frequency bin is less than the threshold for that bin, the signal receives unity gain. Otherwise, the signal value is modified in accordance with the portion of the gain curve to the right of the threshold value in FIG. 8. For values between the threshold and about two times the threshold, the signal value is reduced by a generally decreasing amount as shown, and greater signal values are reduced to zero. This operation effects soft limiting on those signal bins that exceed the threshold by small amounts, and total annihilation of those signal bins that exceed it by greater amounts. Other gain functions having these general characteristics can also be used. The following exact function, which attenuates to zero all inputs that exceed the threshold by more than a factor of two, has been used in simulations:

$$g(n,k)=1-\min(1, \max(0,((M(n,k)/T(n,k))-1)^2))$$

As a final step in the frequency domain processing chain, the frequency extent of the applied attenuation is broadened by the convolution operation 24 (FIG. 3). The function 1−g(n,k) is convolved with a spreading function to reduce the effect of the excision operation on the reconstructed time sequence. In particular, the use of the spreading function reduces the time extent of distortion introduced by the excision. The three point spreading sequence S={½, 1, ½} has been used in experiments. The resultant overall gain factor which is applied to the complex FFT coefficients is given by $$G(n,k)=\max(0,(½)\times g(n-1, k)_N+g(n,k)+(½)\times g(n+1, k)_N-1)$$

Application of this gain factor to the FFT coefficients produces the $k^{th}$ block of N complex output points of the frequency domain processing (FIG. 3), i.e., $$Z(n,k)=G(n,k)\times(X(n,k)+jY(n,k))$$

The resulting frequency domain sequence is then transformed back into the time domain via the N-point inverse Fourier Transform processing 26.

As described earlier, because of the input windowing 16 the output of the IFFT processing 26 exhibits a time-varying amplitude modulation which can be detrimental to the performance of downstream demodulation and processing operations. A significant improvement is achieved by combining inverse windowing processing 28 with the overlap-save transform approach. Inverse windowing is performed by multiplying the complex output data produced by the IFFT 26 by the function 1/W(n). The complementary Blackman window W(m) and inverse Blackman window 1/W(n) are shown in FIGS. 4 and 5 respectively. In general, the application of an inverse window following the IFFT 26 could introduce noise and interference energy at and near the edges of the data record, since the windows themselves tend to zero at the end points (FIG. 4). However, an inverse window is well-behaved near the center of the record, as shown in FIG. 5, and therefore can be utilized with overlap-save processing without these deleterious effects.

It can be shown theoretically that the overall transfer function of the disclosed excision system is identically unity in the absence of any frequency domain excision action, assuming reasonable arithmetic precision (e.g., floating point) in its implementation. In other words, modification of the desired signal occurs only when spectral components are excised, and these modifications are focused entirely on the excised frequencies. The net result is a universal excision technique which imposes minimal distortion on the desired signal, needs no synchronization or timing cues from the host receiver other than a commensurate rate sampling clock, and which requires no modification to the receiver's original demodulation logic. The excision system can be considered to be a pure applique, because it operates independently of the demodulator. It is inherently compatible with virtually any digital modulation scheme.

Figure 9:
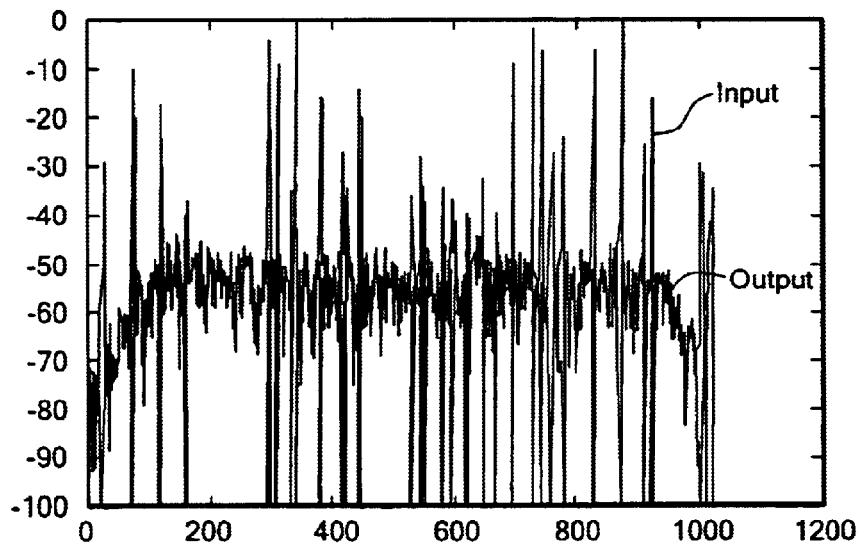
FIG. 9 is a plot of input and output frequency spectra in the excision system of FIG. 3.
Figure 10:
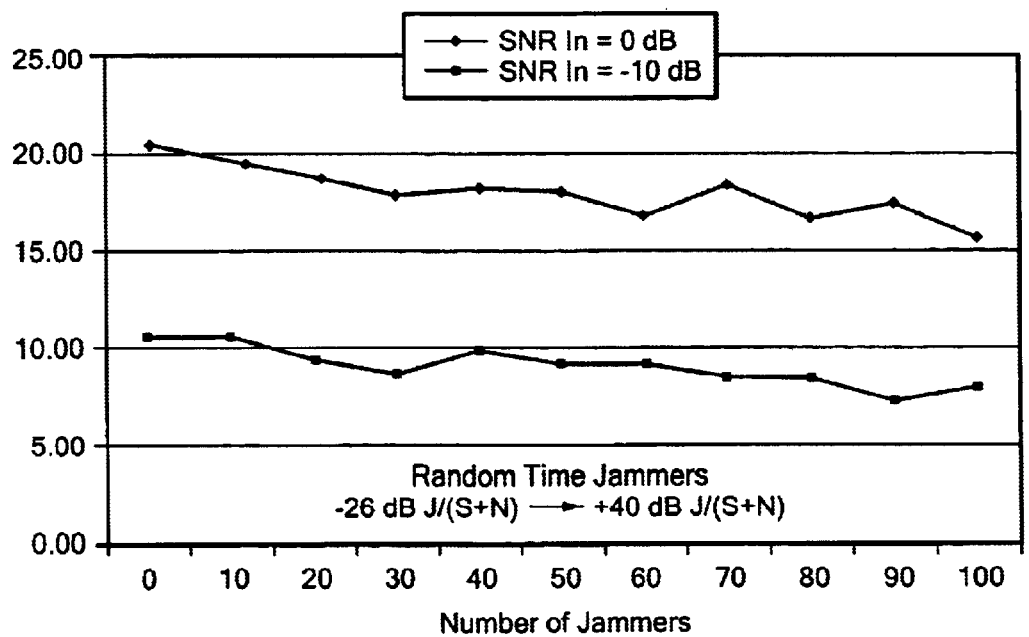
FIG. 10 is a plot of the output signal-to-noise ratio of the excision system of FIG. 3 as a function of the number of narrowband interfering signals.

In order to assess its performance, the above-described excision system was inserted into an end-to-end MATLAB simulation of a spread-spectrum radio with 21 dB of spreading gain. FIGS. 9 and 10 show relevant performance results of these simulations.

FIG. 9 shows a plot of an input signal and the resulting excision output signal. The input signal is received at 0 dB SNR and includes 50 interfering narrowband signals at randomly selected frequencies and amplitudes. The horizontal axis indicates frequency bin number, from 1 to 1024. The vertical axis is labeled in dB. It will be observed that the output excision output approximates the spectrum of the input spread spectrum signal plus a small amount of additive white Gaussian noise, at 0 dB SNR. The droop observed at the band edges results from an input band-limiting filter in the receiver (not shown), whose bandwidth is matched to that of the desired signal.

FIG. 10 shows the overall performance of the excision sub-system when installed in the aforementioned spread spectrum radio having 21 dB of processing gain, as a function of the number of interfering signals present in the band of the desired signal. Experiments were run at 0 dB and −10 dB input SNR at the receiver. Each trial used a different, randomly selected set of interfering signals having random frequencies and amplitudes. The amplitudes of the interfering signals varied over a 60 dB range, and included signals less than the excision threshold as well as signals exceeding it by as much as 50 dB. The curves of FIG. 10 indicate graceful degradation of performance as a function of number of interfering signals present, for up to 100 simultaneous interfering signals in the band of the signal.

Other beneficial aspects of the disclosed system include the following:

1. Large numbers (e.g., 20–100) of narrowband interfering signals can be handled and excised simultaneously.

2. Excision performance is independent of the frequencies of the interference. Interfering sources may be centered at arbitrary or random frequencies in the band of the desired spread spectrum signal, and simultaneous interfering sources may have substantially different amplitudes, e.g., spanning a dynamic range of 50 dB or more.

3. In the absence of interfering signals, the excision system introduces virtually no change to the received signal. Distortion or modification of the desired waveform is essentially zero at frequencies other than those at which interfering signals exist.

4. The excision system is adaptive and responds rapidly to changes in the RF environment.

5. Frequencies and amplitudes of interfering sources are determined implicitly as part of the excision control logic, and this information can be made available for communication to other equipment for various purposes. For example, this information can be supplied to remote transmitters to support adaptive transmission strategies to avoid occupied spectral regions.

6. The excision methodology is independent of the details of the spread spectrum signaling waveform; it requires no knowledge of waveform parameters. It can therefore be implemented as a universal applique, and incorporated as a tandem module into a spread spectrum receiver without modification.

It will be apparent to those skilled in the art that other modifications to and variations of the disclosed system and methods are possible without departing from the inventive concepts disclosed herein, and therefore the invention should not be viewed as limited except to the full scope and spirit of the appended claims.

What is claimed is:

1. A method of performing frequency domain excision on a received signal including a desired wideband signal component, comprising:

applying a window function to each of overlapped blocks of samples of the received signal to generate windowed blocks of signal samples, the window function having a central maximum and tapering to zero at beginning and ending points;

performing a predetermined transform function on each of the windowed blocks of signal samples to generate corresponding blocks of frequency-domain coefficients;

for each block of frequency-domain coefficients:
(1) morphologically filtering the coefficients to generate a threshold function representing an estimate of the spectrum of the desired wideband signal component, the threshold function including a plurality of threshold values corresponding to the coefficients; and
(ii) applying a gain function to each coefficient to generate an excised block of coefficients, the gain function for each coefficient having a fixed-gain region for input values less than the corresponding threshold value from the threshold function, an excision region for input values greater than a predetermined multiple of the corresponding threshold value, and a soft limiting region between the fixed-gain region and the excision region;

performing the inverse of the transform function on the excised blocks of coefficients to generate excised blocks of signal samples; and applying an overlap-eliminating central portion of the inverse of the window function to each excised block of signal samples.

2. A method according to claim 1, wherein the blocks of signal samples overlap by an amount in the range of 25% to 75%.

3. A method according to claim 2, wherein the blocks of signal samples overlap by 50%.

4. A method according to claim 1, wherein the blocks of signal samples overlap by 50% and the central portion of the inverse window function is the central 50% of the inverse window function.

5. A method according to claim 1, wherein the morphological filtering of each block of frequency-domain coefficients comprises:

performing a grayscale closing of the coefficients by (i) calculating a first function having values corresponding to the coefficients, each value of the first function being equal to the value of the largest coefficient in a small neighborhood of the corresponding coefficient as defined by a first kernel, and (ii) calculating a second function having values corresponding to the values of the first function, each value of the second function being equal to the smallest value in a small neighborhood of the corresponding value of the first function as defined by the first kernel; and performing a grayscale opening of the second function by (i) calculating a third function having values corresponding to the values of the second function, each value of the third function being equal to the smallest value in a large neighborhood of the corresponding value of the second function as defined by a second kernel, and (ii) calculating a fourth function having values corresponding to the values of the third function, each value of the fourth function being equal to the largest value in a large neighborhood of the corresponding value of the third function as defined by the second kernel.

6. A method according to claim 5, wherein the first kernel has a size of less than one percent of the number of coefficients in each block and the second kernel is about ten times larger than the first kernel.

7. A method according to claim 6, wherein the size of the first kernel is about 5, and the size of the second kernel is about 50.

8. A method according to claim 1, wherein the predetermined multiple defining the excision region is about 2.

9. A method according to claim 1, wherein the gain in the soft limiting region falls off in proportion to the square of the normalized difference between the value of the coefficient and the threshold value.

10. A method according to claim 1, further comprising convolving the output of the gain function with a spreading function to reduce the time extent of the effect of the excision on the excised blocks of signal samples.

11. An excision system for performing frequency domain excision on a received signal including a desired wideband signal component, comprising:

a window component operative to apply a window function to each of overlapped blocks of samples of the received signal to generate windowed blocks of signal samples, the window function having a central maximum and tapering to zero at beginning and ending points;

a transform component operative to perform a predetermined transform function on each of the windowed blocks of signal samples to generate corresponding blocks of frequency-domain coefficients;

an excision processing component operative for each block of frequency-domain coefficients to:
(1) morphologically filter the coefficients to generate a threshold function representing an estimate of the spectrum of the desired wideband signal component, the threshold function including a plurality of threshold values corresponding to the coefficients; and
(ii) apply a gain function to each coefficient to generate an excised block of coefficients, the gain function for each coefficient having a fixed-gain region for input values less than the corresponding threshold value from the threshold function, an excision region for input values greater than a predetermined multiple of the corresponding threshold value, and a soft limiting region between the fixed-gain region and the excision region;

an inverse transform component operative to perform the inverse of the transform function on the excised blocks of coefficients to generate excised blocks of signal samples; and an inverse window component operative to apply an overlap-eliminating central portion of the inverse of the window function to each excised block of signal samples.

12. An excision system according to claim 11, wherein the blocks of signal samples overlap by an amount in the range of 25% to 75%.

13. An excision system according to claim 12, wherein the blocks of signal samples overlap by 50%.

14. An excision system according to claim 11, wherein the blocks of signal samples overlap by 50% and the central portion of the inverse window function is the central 50% of the inverse window function.

15. An excision system according to claim 11, wherein the morphological filtering of each block of frequency-domain coefficients comprises:

performing a grayscale closing of the coefficients by (i) calculating a first function having values corresponding to the coefficients, each value of the first function being equal to the value of the largest coefficient in a small neighborhood of the corresponding coefficient as defined by a first kernel, and (ii) calculating a second function having values corresponding to the values of the first function, each value of the second function being equal to the smallest value in a small neighborhood of the corresponding value of the first function as defined by the first kernel; and performing a grayscale opening of the second function by (i) calculating a third function having values corresponding to the values of the second function, each value of the third function being equal to the smallest value in a large neighborhood of the corresponding value of the second function as defined by a second kernel, and (ii) calculating a fourth function having values corresponding to the values of the third function, each value of the fourth function being equal to the largest value in a large neighborhood of the corresponding value of the third function as defined by the second kernel.

16. An excision system according to claim 15, wherein the first kernel has a size of less than one percent of the number of coefficients in each block and the second kernel is about ten times larger than the first kernel.

17. An excision system according to claim 16, wherein the size of the first kernel is about 5, and the size of the second kernel is about 50.

18. An excision system according to claim 11, wherein the predetermined multiple defining the excision region is about 2.

19. An excision system according to claim 11, wherein the gain in the soft limiting region falls off in proportion to the square of the normalized difference between the value of the coefficient and the threshold value.

20. An excision system according to claim 11, further comprising a convolving component operative to convolve the output of the gain function with a spreading function to reduce the effect of the excision on the excised blocks of signal samples.

* * * * *

UNITED STATES PATENT AND TRADEMARK OFFICE
CERTIFICATE OF CORRECTION

PATENT NO. : 6,868,114 B2  
APPLICATION NO. : 09/919121  
DATED : March 15, 2005  
INVENTOR(S) : Theodore Bially et al.

Page 1 of 1

It is certified that error appears in the above-identified patent and that said Letters Patent is hereby corrected as shown below:

TITLE page, Abstract (57), line 1, "wide band" should read --wideband--; and

TITLE page, Abstract (57), line 7, "wide band" should read --wideband--.

Signed and Sealed this

Eleventh Day of July, 2006

JON W. DUDAS  
*Director of the United States Patent and Trademark Office*